Feb. 27, 1968  S. A. PAOLI  3,370,321
METHOD FOR REMOVING MEAT FROM BONES
Original Filed Sept. 6, 1963  13 Sheets-Sheet 1
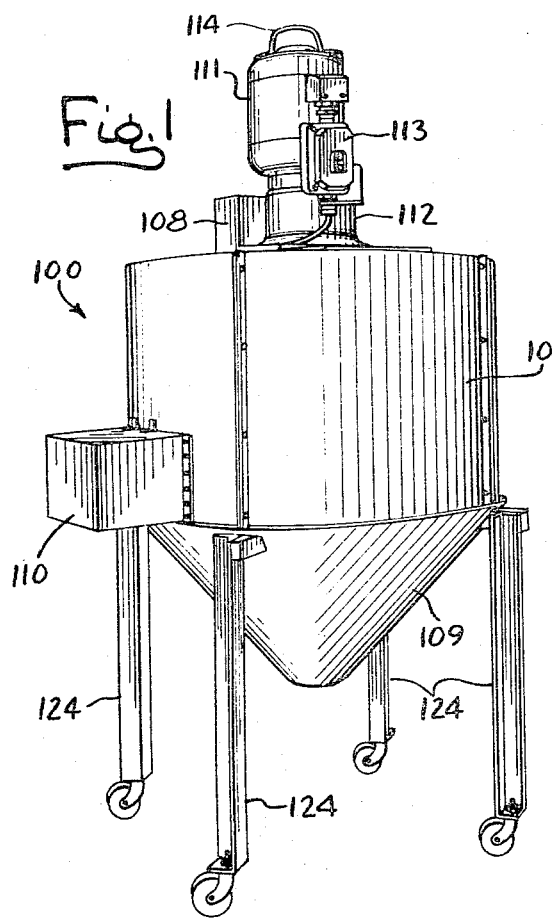
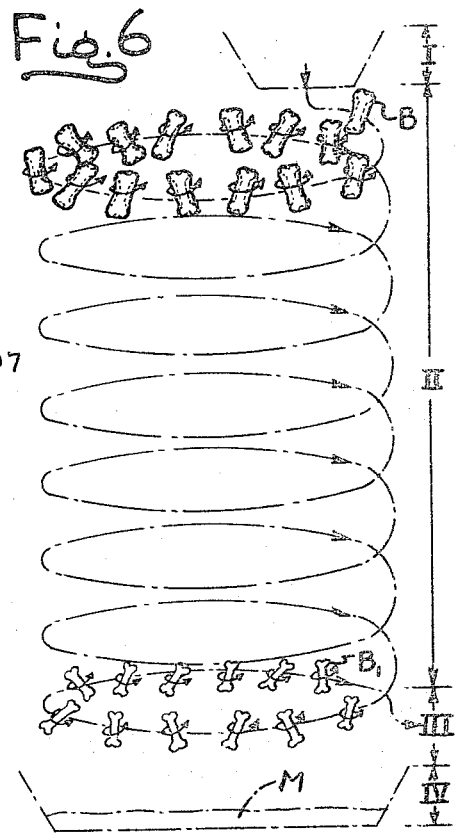
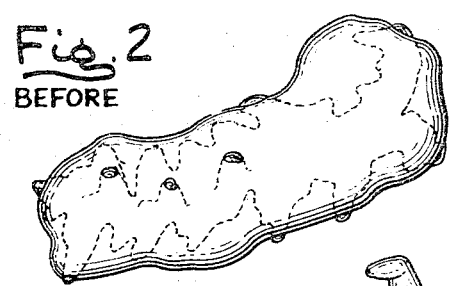
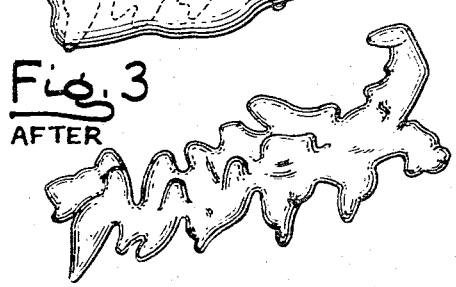
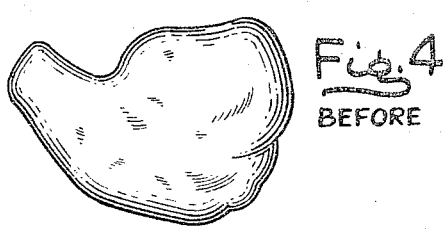
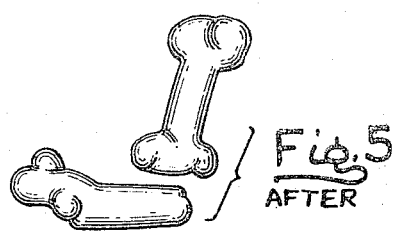
INVENTOR.
STEPHEN A. PAOLI
BY
Wolfe, Hubbard, Voit & Osann
ATTYS.

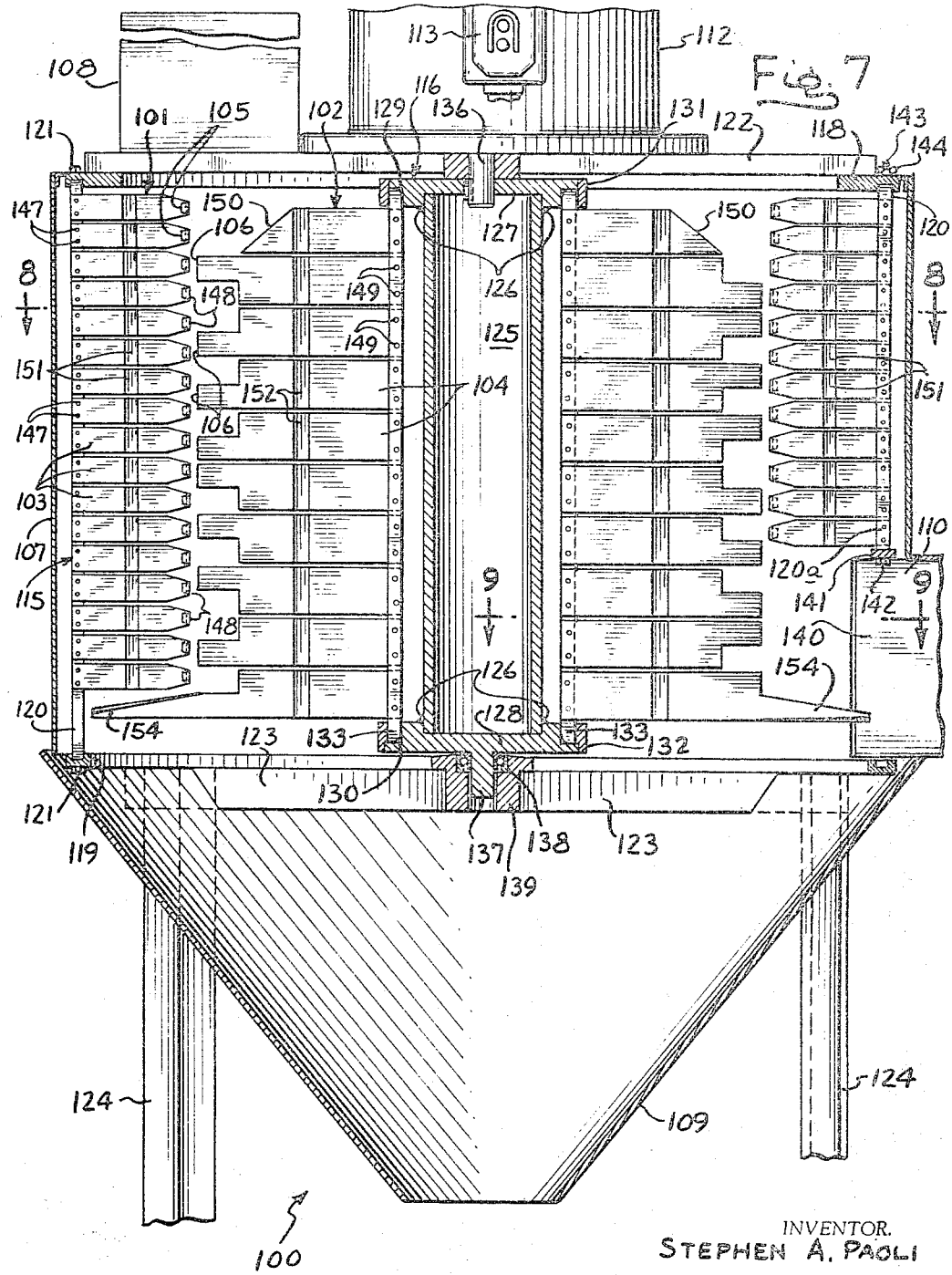

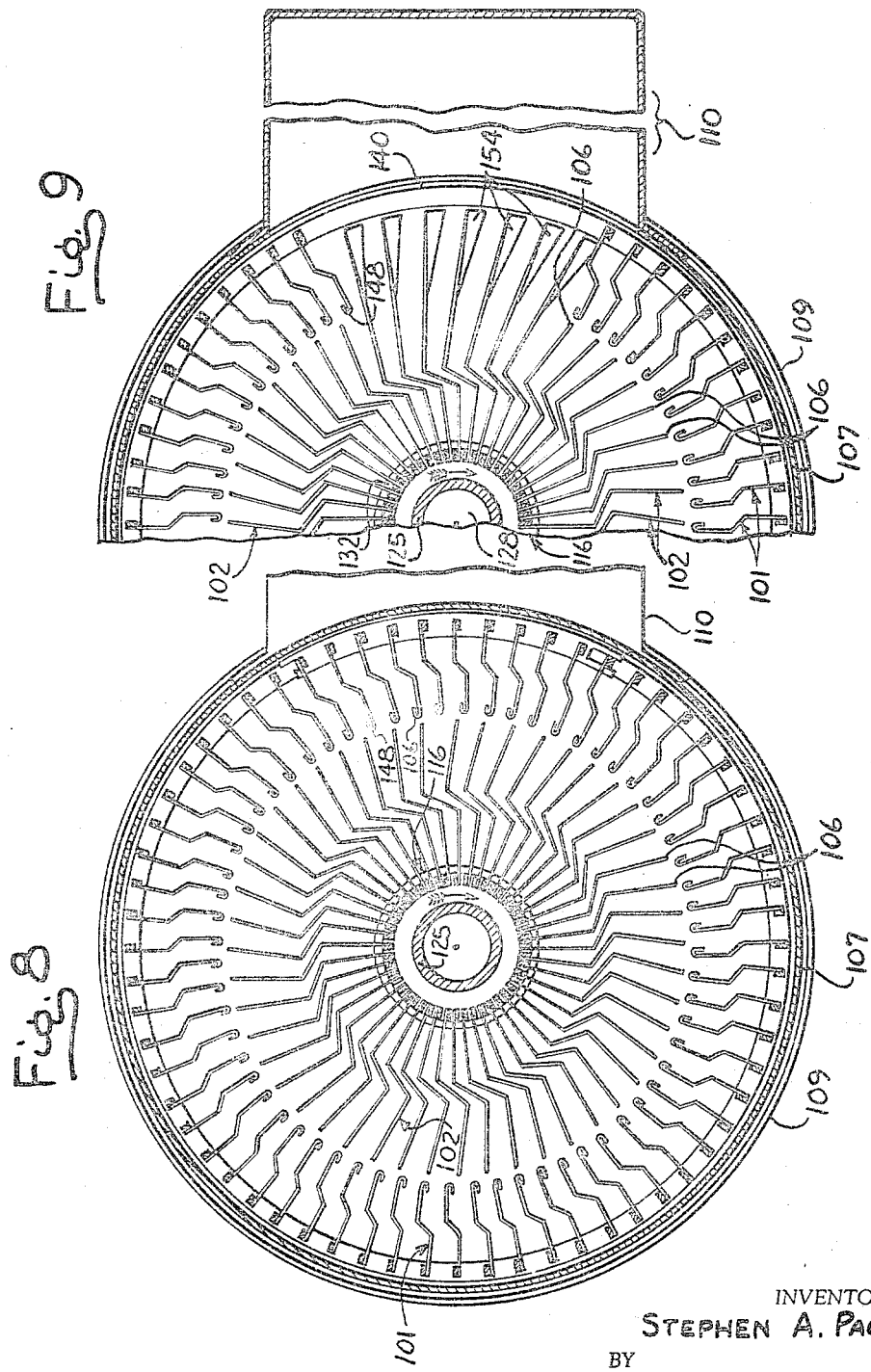

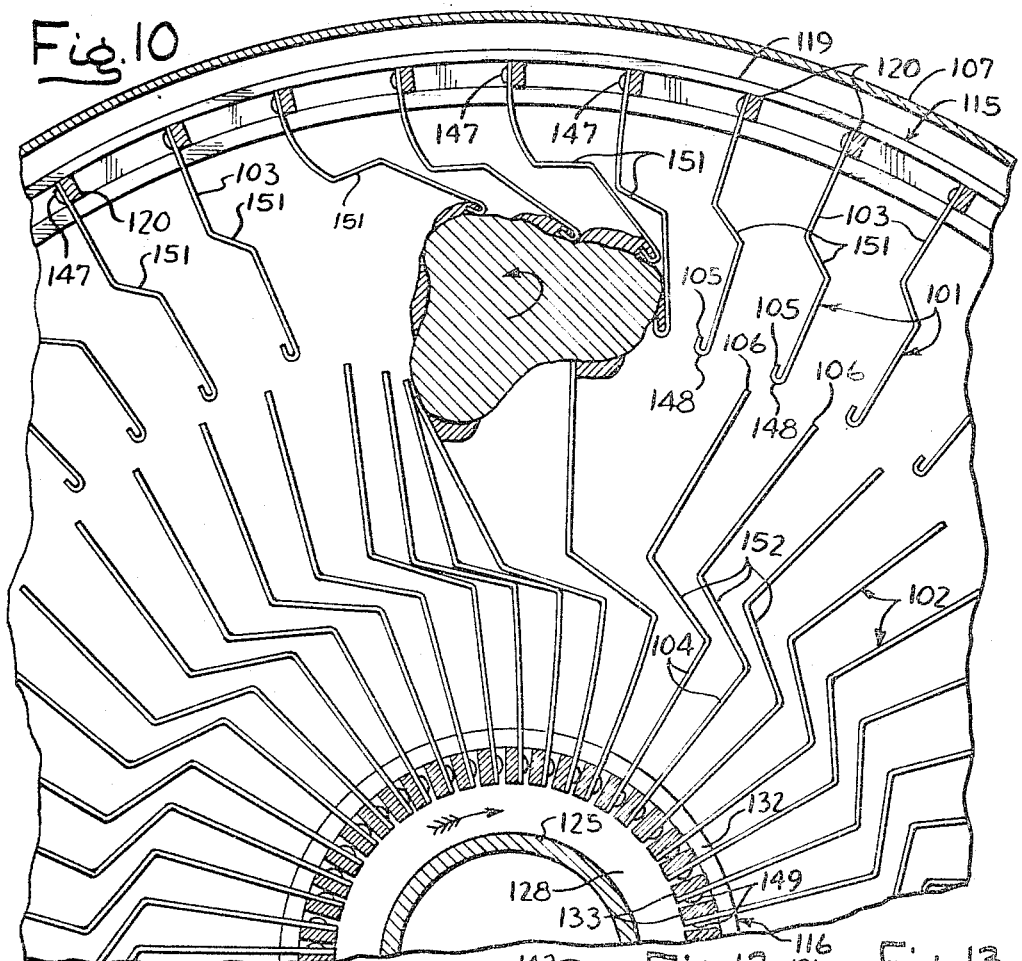
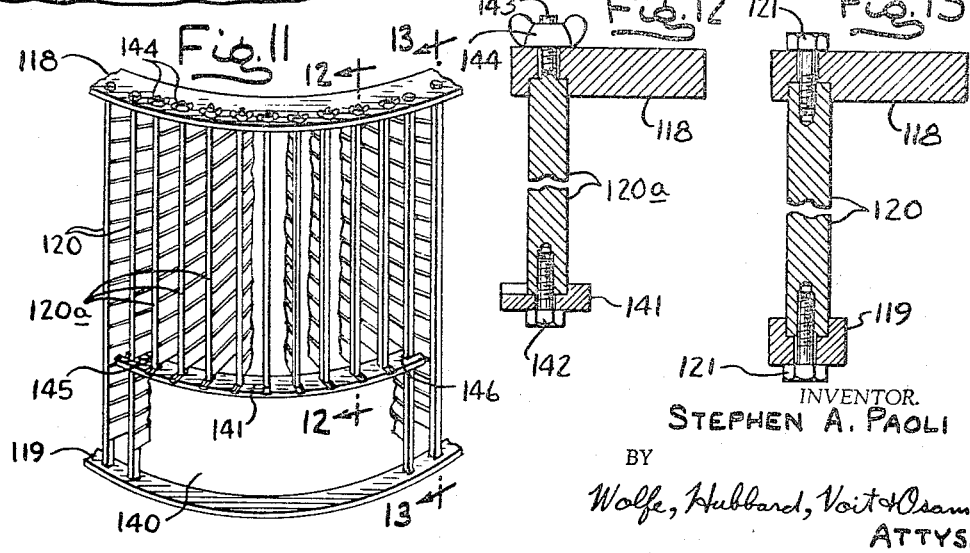

INVENTOR.
STEPHEN A. PAOLI
BY
Wolfe, Hibbard, Voit & Osann
ATTYS.

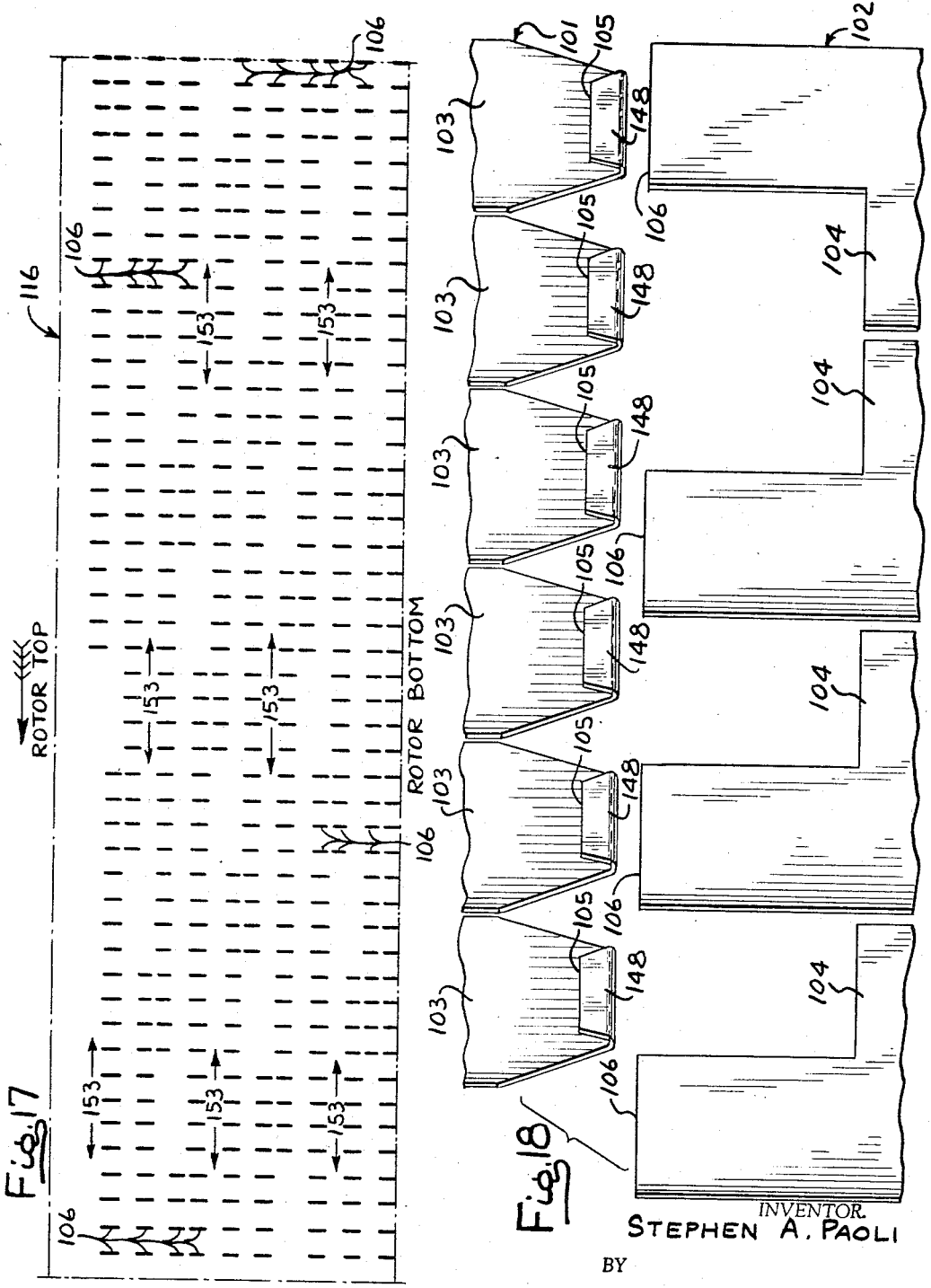

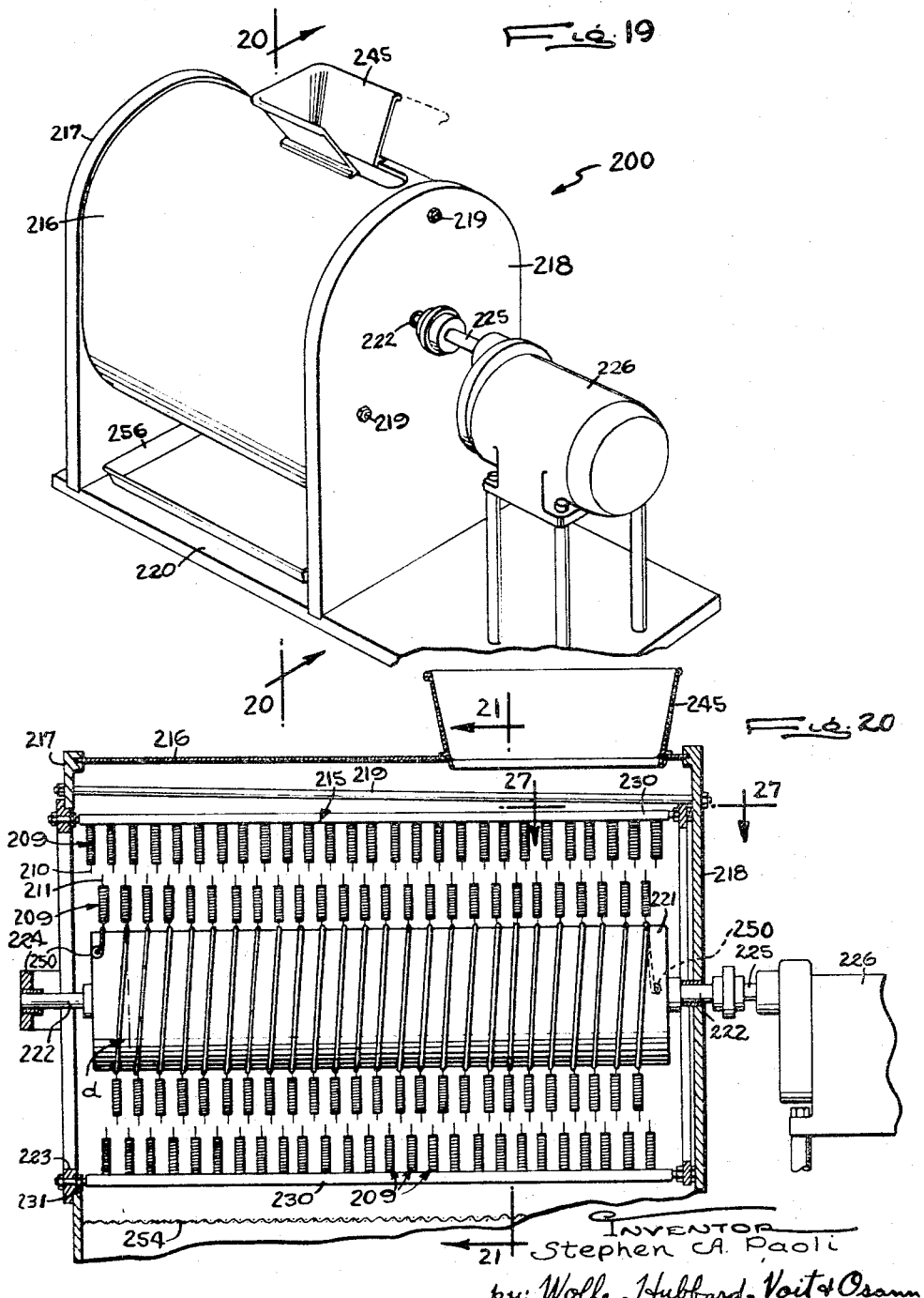

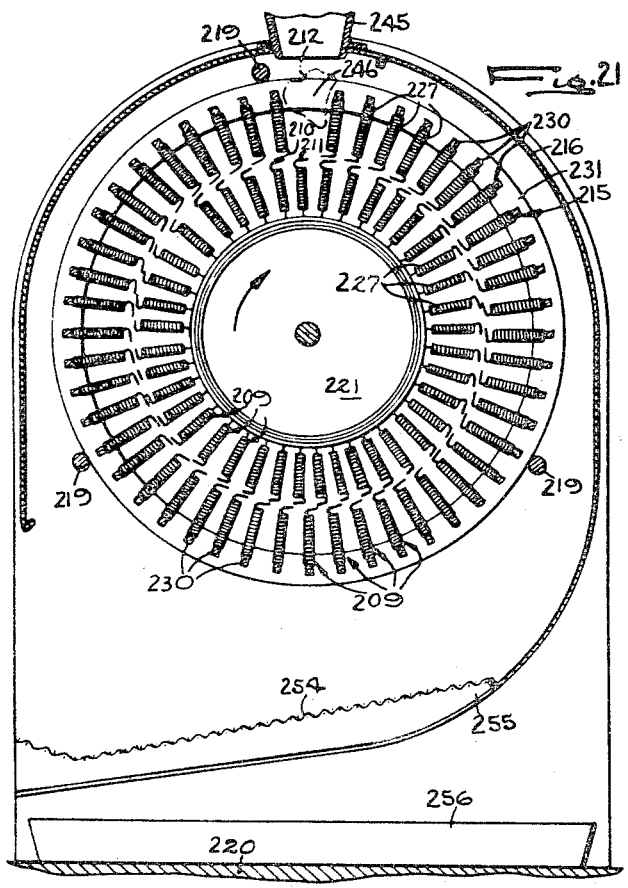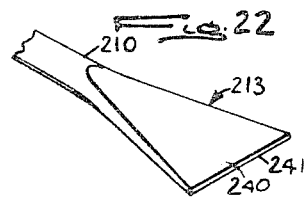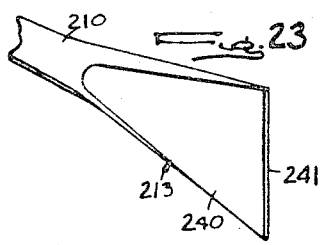

INVENTOR.
STEPHEN A. PAOLI
BY
Wolfe, Hubbard, Voit & Osann
ATTYS

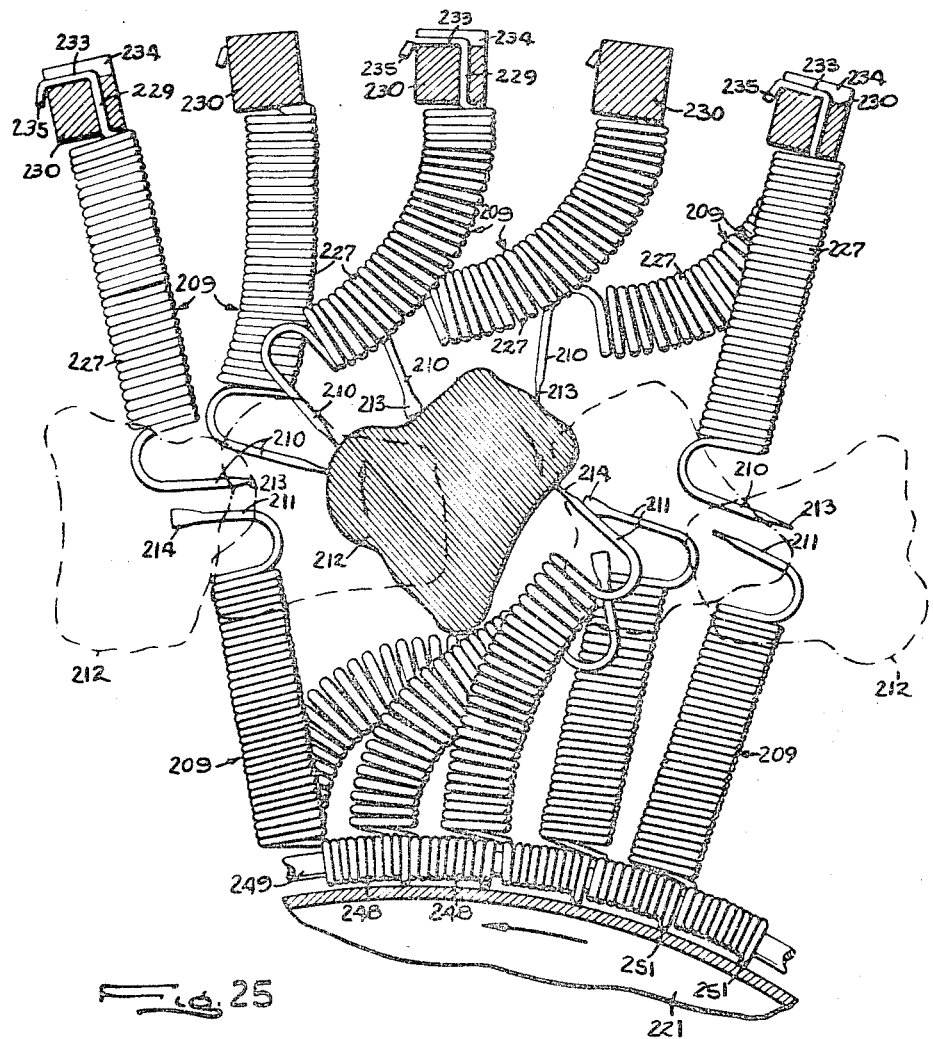

Feb. 27, 1968        S. A. PAOLI        3,370,321
METHOD FOR REMOVING MEAT FROM BONES
Original Filed Sept. 6, 1963        13 Sheets-Sheet 11
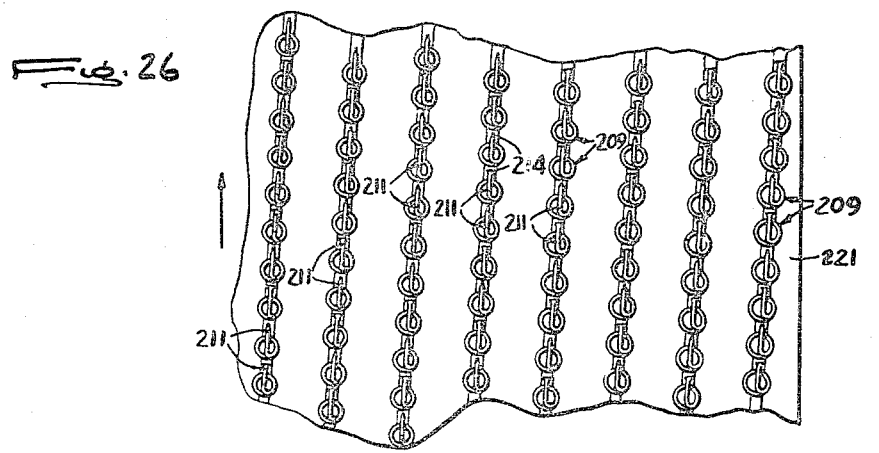
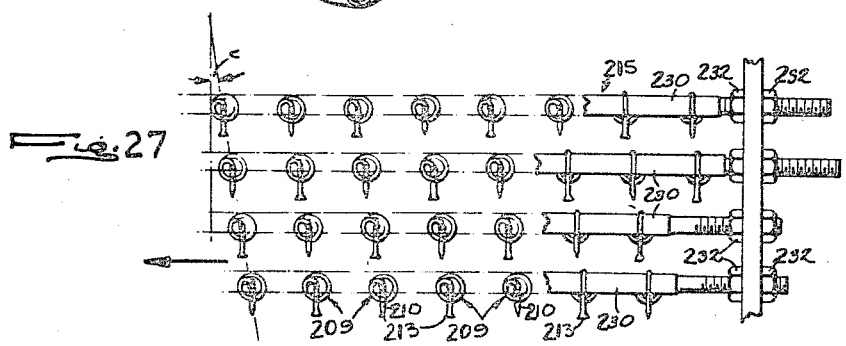
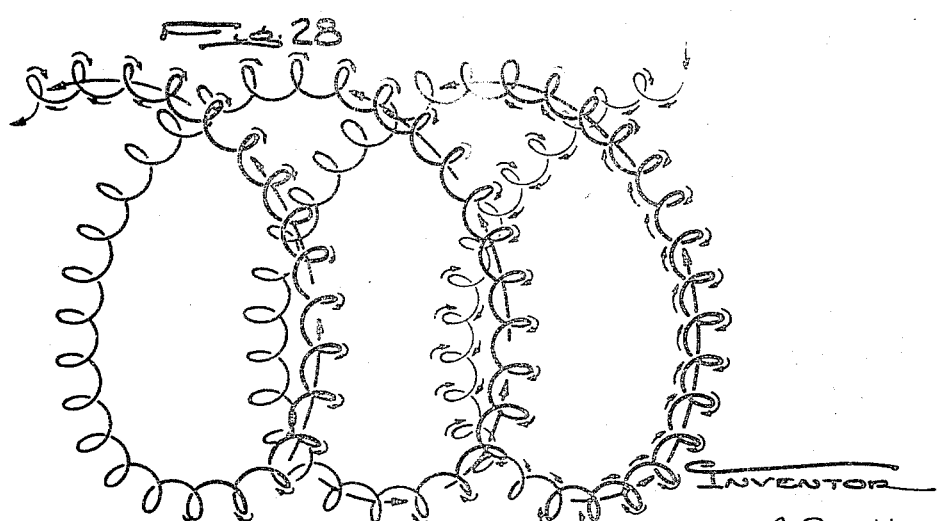

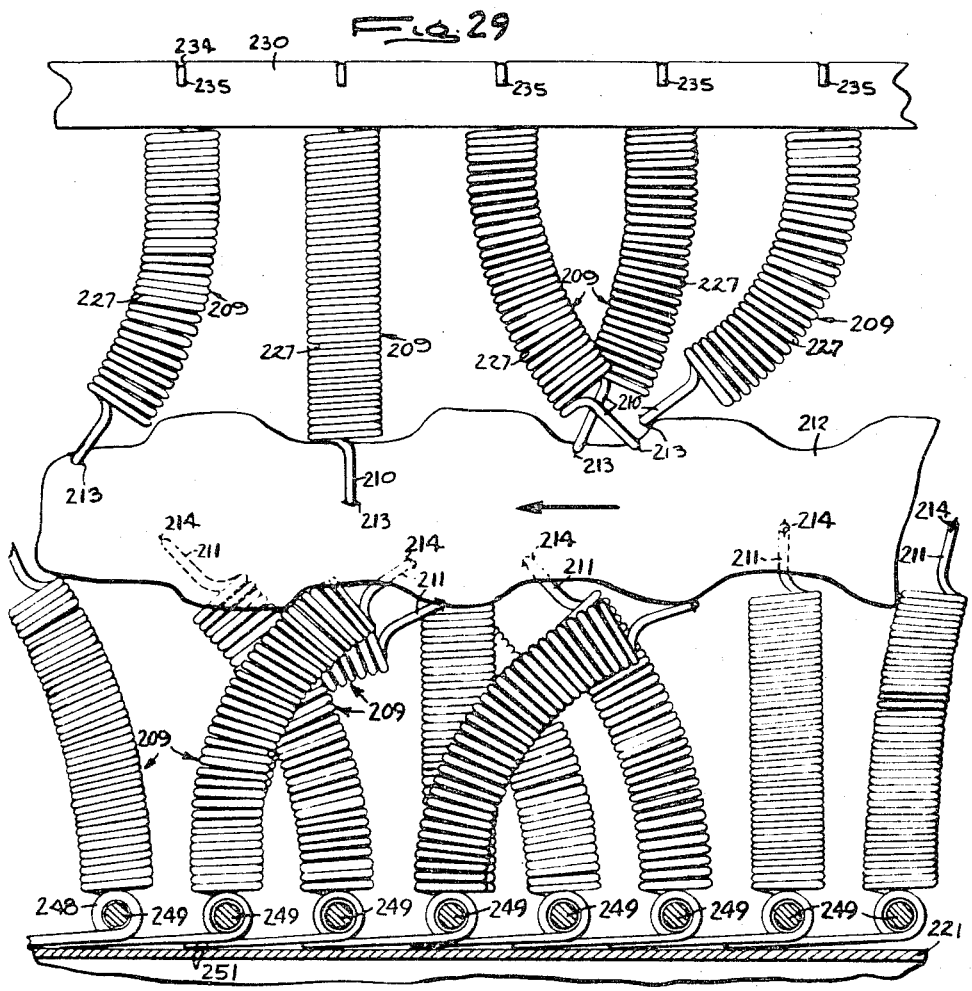

Feb. 27, 1968     S. A. PAOLI     3,370,321
METHOD FOR REMOVING MEAT FROM BONES
Original Filed Sept. 6, 1963     13 Sheets-Sheet 13
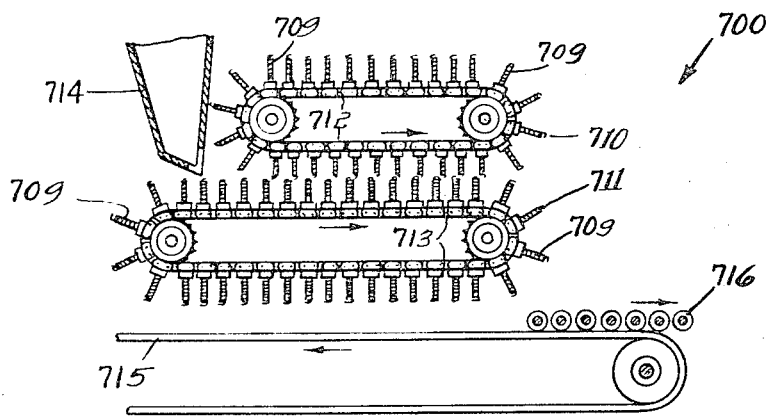
INVENTOR.
Stephen A. Paoli
BY Wolfe, Hubbard, Voit & Osann
Attys

United States Patent Office 3,370,321
Patented Feb. 27, 1968

3,370,321
METHOD FOR REMOVING MEAT FROM BONES
Stephen A. Paoli, 821 Westchester Drive,
Rockford, Ill. 61107
Original application Sept. 6, 1963, Ser. No. 307,148, now Patent No. 3,256,555, dated June 21, 1966. Divided and this application June 29, 1965, Ser. No. 482,650
11 Claims. (Cl. 17—45)

The present invention pertains to the removal of meat from bones, and this application is a continuation-in-part of my copending application Ser. No. 101,038, filed Mar. 30, 1961, as a continuation-in-part of my earlier filed applications Ser. No. 685,042, filed Sept. 19, 1957, and Ser. No. 494,160, filed Mar. 14, 1955, now abandoned. This application is a division of my copending application Ser. No. 307,148, filed Sept. 6, 1963, now Patent No. 3,256,555, granted June 21, 1966.

One of the major problems in the butchering and meat packing industry heretofore has been the removal of meat from bones and the salvaging of the meat which remains on the bones following ordinary deboning operations. Bones subjected to conventional deboning methods usually carry a relatively large amount of residual meat which may be used for making hamburger, lunch meat and similar products. Such meat, being almost all lean, is particularly valuable for these purposes. It has been customary to cut and remove from the bones manually as much of this residual meat as possible. This involves skilled, high cost labor manually wielding deboning knives. The procedure is time consuming, expensive, and even when completed, considerable valuable meat still remains on the bones.

The principal object of this invention is to provide a method for automatically removing meat from bones. The invention may be utilized for removing the remainder of the meat from the bones following hand cutting or trimming of the meat with deboning knives, thus salvaging such meat. The invention may also be utilized for removing all of the meat from the bones before, as well as after, the manual deboning operation, thus eliminating the necessity for hand trimming or cutting and providing a major step toward automation in the packing and butchering industry.

Another object is to provide a method of removing meat from a wide variety of bones wherein each bone is subjected to yieldable cleaning elements which impart to it a random tumbling motion exposing substantially its entire area to the action of the cleaning elements, and wherein the bone is simultaneously moved along a generally predetermined path through and out of the cleaning zone as an incident to exposure to the cleaning elements.

A further object is to provide a method of automatically removing meat from bones wherein each bone is passed from a loading zone to a cleaning zone, tumbled at random by yieldable cleaning elements on an individual shifting axis disposed generally longitudinally of the bone, and simultaneously moved bodily through the cleaning zone to a bone discharge zone as an incident to exposure to the cleaning elements, the meat removed in the cleaning zone being delivered to a collecting zone.

Other objects and advantages of the invention will become apparent from the following detailed description taken in connection with the accompanying drawings, in which:

FIGURE 1 is a perspective view of one form of bone cleaning machine by means of which the method of the present invention thereof may be practiced.

FIGS. 2 and 3 are sequential views of one form of meat and bone product before and after processing in accordance with the present invention.

FIGS. 4 and 5 are sequential views of another form of meat and bone product before and after processing in accordance with the present invention.

FIG. 6 is a diagrammatic view illustrating one mode of carrying out the method of the present invention.

FIG. 7 is an enlarged fragmentary vertical sectional view taken axially through the illustrative bone cleaning machine of FIG. 1.

FIGS. 8 and 9 are fragmentary horizontal sectional views through the machine, taken respectively in the planes of the lines 8—8 and 9—9 in FIG. 7 but on a slightly reduced scale.

FIG. 10 is a further enlarged fragmentary horizontal sectional view through the rotor and stator of the machine of FIG. 1 and illustrating its bone cleaning action.

FIG. 11 is a fragmentary perspective view, on a somewhat reduced scale, showing a portion of the stator of the machine of FIG. 1 adjacent the bone discharge aperture.

FIGS. 12 and 13 are enlarged fragmentary sectional views taken respectively in the lines 12—12 and 13—13 of FIG. 11.

Figure 14:
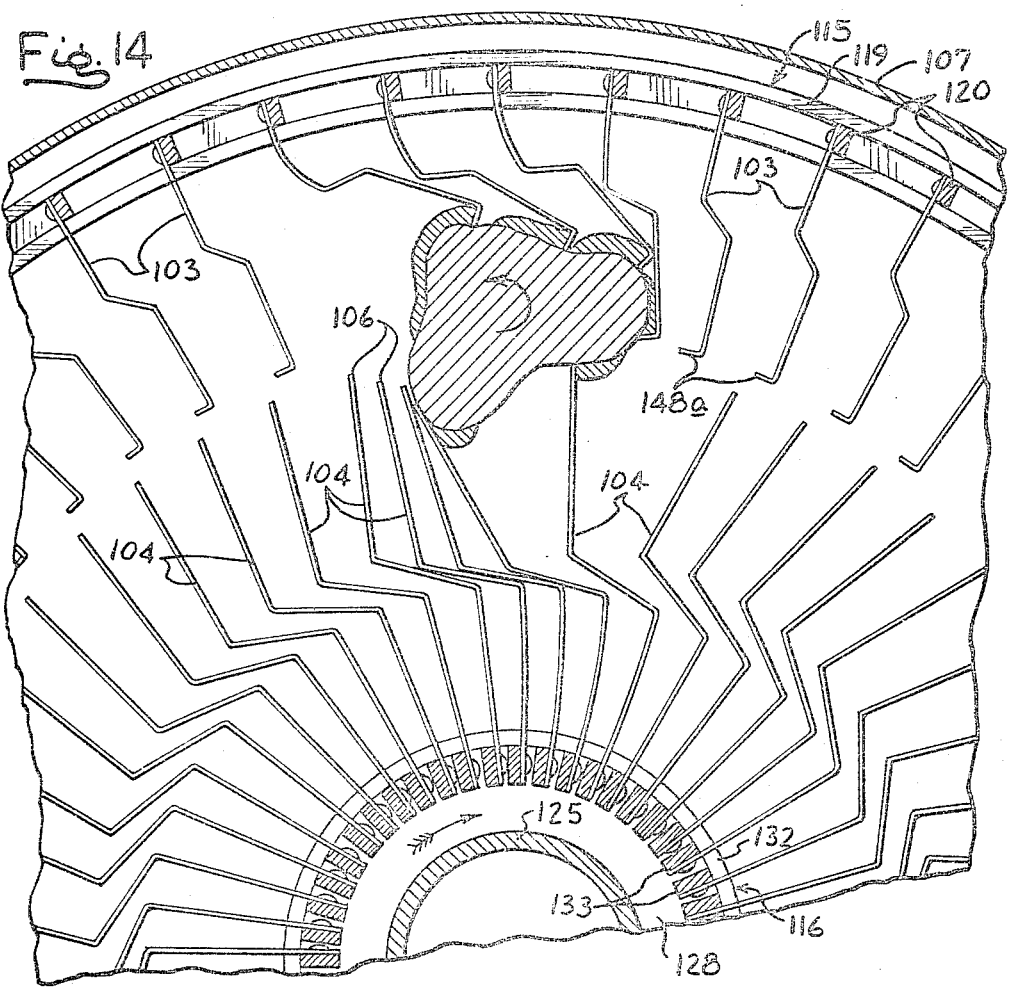

FIG. 14 is an enlarged fragmentary sectional view similar to FIG. 10 but showing slightly modified cleaning elements on the stator.

Figure 15:
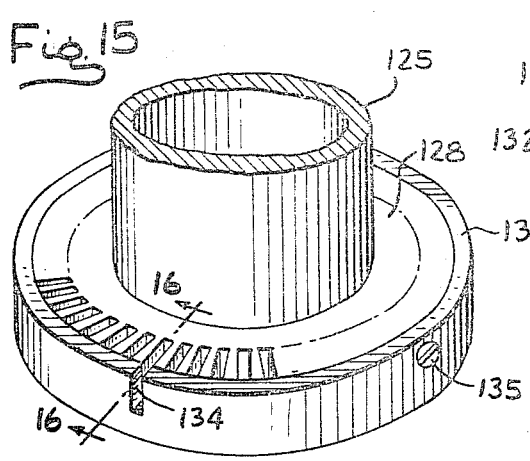

FIG. 15 is an enlarged fragmentary perspective view illustrating the lower end portion of the rotor of the machine of FIG. 1 but with the cleaning elements removed.

Figure 16:
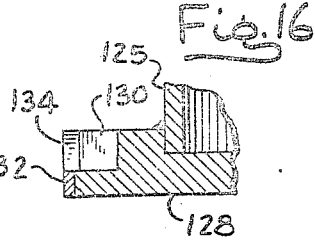

FIG. 16 is an enlarged fragmentary transverse sectional view taken in the plane of the line 16—16 of FIG. 15.

FIG. 17 is a diagrammatic developmental view of the outer periphery of the rotor of the machine of FIG. 1 showing the position and spacing of the cleaning elements thereon.

FIG. 18 is an enlarged fragmentary perspective view illustrating the projecting end portions of the cleaning elements of the rotor and stator of the machine shown in FIG. 1.

FIG. 19 is a fragmentary perspective view of another form of illustrative bone cleaning machine by means of which the method of the invention may be carried out.

FIG. 20 is an enlarged fragmentary vertical sectional view taken along the line 20—20 in FIG. 1.

FIG. 21 is a fragmentary sectional view taken in the plane of the line 21—21 in FIG. 20.

FIGS. 22 and 23 are enlarged fragmentary perspective views of certain cleaning elements or blades in the machine of FIG. 19.

Figure 24:
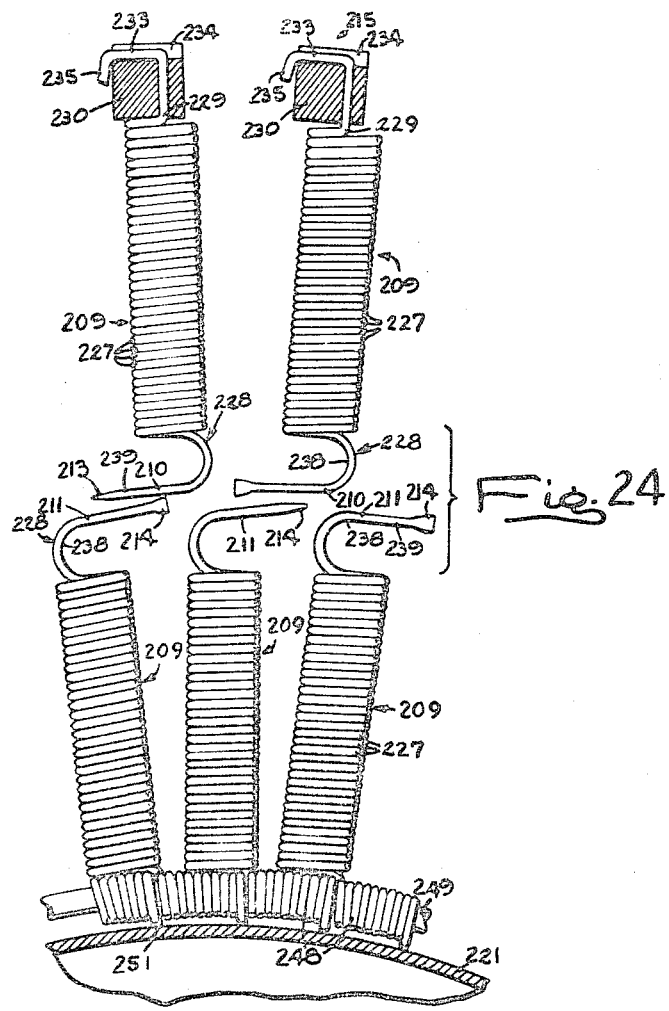

FIG. 24 is an enlarged fragmentary vertical sectional view through a portion of the machine as shown in FIG. 21.

FIG. 25 is an enlarged fragmentary sectional view similar to FIG. 24 but illustrating the action of the cleaning elements in the machine.

FIG. 26 is an enlarged fragmentary developmental view illustrating a portion of the rotor of the machine shown in FIG. 20.

FIG. 27 is an enlarged fragmentary developmental view taken in the plane of the line 27—27 in FIG. 20.

FIG. 28 is a diagrammatic view illustrating the approximate motion and path of a bone while being cleaned in the machine of FIG. 19.

FIG. 29 is an enlarged view further illustrating the action of the cleaning elements of a machne as shown in FIG. 20.

Figure 30:
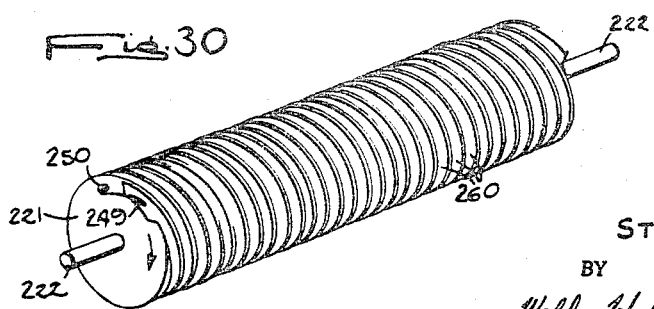

FIG. 30 is a perspective view of a modified form of rotor.

FIG. 31 is a perspective view of another illustrative form of bone cleaning machine also adapted for carrying out the method of the invention.

While the invention is susceptible of various modifications, alternative constructions and modes, I have shown in the drawings and will herein describe in detail several illustrative embodiments. It is to be understood, however, that I do not intend to limit the invention by such disclosures, but aim to cover all modifications, alternative constructions, modes and equivalents falling within the spirit and scope of the invention as expressed in the appended claims.

The method of the present invention is applicable to a broad variety of meat-laden bones such as those shown in FIGS. 2 and 4. The expression "meat-laden bone," as used herein, includes manually cleaned bones which still carry residual meat, bones from which the primal cuts of meat have been removed but which have not been manually cleaned, and complete bone-in cuts of meat such as rounds, shanks, necks and shoulders. The two illustrated items are simply exemplary of this broad variety of meat and bone products handled by the invention.

FIG. 2 shows a non-disjointed beef neck bone from which a portion of the meat has been trimmed manually in accordance with ordinary packing house practice. After processing by application of the method and apparatus of the present invention, the remaining meat is cleaned from the bone and the latter is left in the condition illustrated in FIG. 3. The meat which is removed is in generally comminuted form and includes a high proportion of edible lean meat. It is collected in the course of the cleaning operation and is suitable for sale to consumers or subsequent processing into many different meat foods.

FIG. 4 shows a bone-in cut of pork commonly known as a picnic shoulder. This cut may be processed directly by application of the method and apparatus of the invention without prior manual removal of meat therefrom. In the course of such processing the meat is removed from the bones of the picnic shoulder and collected for subsequent use, the bones being left in the cleaned condition shown in FIG. 5.

Referring more specifically to FIG. 6, one illustrative mode of practicing the method of the present invention and applying it to a meat-laden bone B is there shown diagrammatically. The bone B, in this case a manually cleaned bone with residual meat thereon, is passed from a loading zone I into a cleaning zone II where the meat is removed as an incident to its passage therethrough. In the cleaning zone II, meat is cut, scraped, pulled and torn from the bone by relatively movable, yieldable cleaning elements in such manner that it tends to be comminuted into pieces of various size. The cleaned bone $B_1$ is then passed to a bone discharge zone III. The removed meat M tends to drop by gravity from the cleaning elements and into a meat collecting zone IV. In actual practice, of course, a procession of such meat-laden bones B in closely spaced relation is handled.

Provision is made in the cleaning zone for subjecting the meat-laden bone B to the relatively movable yieldable cleaning elements in such manner that the product is tumbled with random motion on an individual, shifting axis in or close to the bone. Such axis tends to be generally longitudinal of the bone and the position of the axis at any instant is determined by the least resistance attitude of the bone to the action of the cleaning elements. This serves to expose substantially all of the external surface of the bone, including crevices, bulges and other irregularities, to the action of the cleaning elements. Simultaneously, the bone is moved bodily along a generally predetermined path through the cleaning zone as an incident to exposure to the cleaning elements. Such predetermined path leads through and out of the cleaning zone and it may have a fixed axis spaced from the shifting individual axis of random tumbling movement.

In the present instance, as indicated in FIG. 6, the bone is progressed with bodily movement through the cleaning zone along a predetermined path of substantially helical or spiral shape. The configuration of the path, as well as the random tumbling motion of the bone as it progresses therealong, are both produced by the disposition and arrangement of the cleaning elements. These elements are yieldable in character and are provided with projecting end portions that are adapted to cut, scrape, pull and tear the meat from the bone.

Turning now to the apparatus by which the method of the present invention may be carried out, it will be noted that such apparatus is exemplified in certain bone cleaning machines described herein. In general, each such bone cleaning machine comprises a first set of cleaning elements including a plurality of resilient arms secured in spaced apart relation on a first mounting means, and a second set of cleaning elements including a plurality of resilient arms secured in spaced apart relation on a second mounting means. The resilient arms of the first and second sets project respectively toward, but short of each other, to define a relatively narrow space between the adjacent free ends thereof, which space is adapted, by lateral bending of the arms, to receive therein a succession of bones to be cleaned. A blade is carried by the free end of each resilient arm with the blades of the two sets of arms respectively oriented for movement in opposite directions. The blades of each set are distributed over a substantial area which may lie substantially in a single plane or in some other surface configuration such as a cylinder or cone. Means are provided for relatively moving the mounting means in one of said directions to carry the opposed blades past each other for removing meat from the bones received therebetween, and for effecting the advance of the bones through the machine, as an incident to such relative movement.

Referring more specifically to FIGS. 1 and 7 to 18, one exemplary bone cleaning machine 100 is there shown comprising generally two sets of cleaning elements 101, 102 projecting toward but short of each other and including laterally yieldable spring arms 103, 104. The elements 101, 102 are mounted to receive a succession of bones B to be cleaned between them and for relative movement past each other to tear, cut, pull or scrape meat from the bone surfaces and also to advance the bones through and out of the cleaning zone defined by the adjacent ends or blades 105 and 106 of the opposed sets of cleaning elements. Such relative movement is achieved in this instance by rotation between the two sets of cleaning elements about a fixed common axis, thus effecting both cleaning action and advance of each bone through the cleaning zone as it is being acted on by the blades of the cleaning elements.

The machine 100 is enclosed within a protective casing 107 which may be constructed in sections and removed for cleaning purposes. Meat and bone products to be processed in the machine may be introduced through an intake chute 108 at the top of the casing 107. Meat removed from the bones by the cleaning elements tends to drop by gravity into a collecting hopper or chute 109 underlying the casing 107. In this instance, the hopper 109 has a central aperture adapted to discharge the collected meat to a suitable conveyor or receptacle (not shown). The bones cleaned in the machine are ejected from an aperture adjacent the lower end of the casing 107 into a discharge housing 110 adapted to divert them onto an underlying conveyor or receptacle.

The machine 100 is power driven by an electric motor 111 and an associated reduction gear unit 112. The motor 111 may conveniently be controlled by means of a start-stop switch 113. A bracket 114 fixed to the top of the motor provides a convenient means for engaging the lifting hook of an overhead crane or chain hoist to facilitate disassembly of the machine.

Although the means employed for effecting the combined cleaning and feeding action may take various forms, the exemplary ones shown herein involve arrangement of the cleaning elements 101, 102 on generally cylindrical mounting means concentric with each other. One such mounting means is held stationary while the other rotates about an axis common to both. In the machine 100, such means include stationary cylindrical mounting means or stator 115, and rotary cylindrical mounting means or rotor 116 concentric therewith (FIGS. 7, 8, 9).

The stator 115 (FIGS. 7 through 10, 13) comprises a generally cylindrical frame or cage 117 defined by annular end walls 118, 119 connected by a plurality of cleaning element support bars 120. The ends of the bars 120 fit into annular grooves in the end walls 118, 119 and are retained in place as by means of cap screws 121 projecting therethrough into axially extending tapped holes in the bars. The support bars 120 are spaced circumferentially and in this instance are vertically disposed. They carry the set of cleaning elements 101 which project generally radially therefrom toward the center of the stator.

At its upper end, the stator 115 supports the drive motor 111 and reduction gear unit 112, these units being fixed to transverse support members 122 which extend diametrically across the upper end wall 118. At its lower end, the stator 115 is supported on intersecting horizontal crossbars 123 attached to structural member legs 124. The latter may terminate at their lower ends in casters or fixed anchor elements.

The rotor 116 (FIGS. 7 through 10, 15, 16) comprises a central drum 125 rigidly fixed as by welds 126 to a pair of axially spaced end caps 127, 128, respectively. The end caps 127, 128 are each formed with a plurality of circumferentially spaced, radial slots 129, 130, respectively. These slots are disposed in axially aligned pairs, each pair being adapted to receive the ends of one of a plurality of circumferentially spaced cleaning element support bars 133 which carry the set of cleaning elements 102. The latter project generally radially from the rotor 116. The ends of the bars 133 are rounded at their inner corners to facilitate entry into their corresponding slots upon assembly of the rotor. The slots 129, 130 have their outer ends closed by retainer rings 131, 132, respectively, which lock the support bars 133 in place.

To facilitate ready assembly and disassembly of the support bars relative to the rotor end caps, the retainer ring 132 is mounted for circumferentially sliding movement on the lower end cap 128. The ring 132 is formed in this instance with a radial slot comparable in width to each of the slots 130 in the end cap 128 (FIGS. 15, 16). With this arrangement, a rotor support bar 133 may be installed by inserting its upper end in the slot 129 of the upper end cap 127, the retainer ring 131 of which is fixed thereon. At or about the same time, the lower retainer ring 132 is rotated to the point where its slot 134 is aligned with the corresponding slot 130 in the lower end cap 128. The lower end of the bar 133 is then slid through the slot 134 and into the slot 130. This process is repeated for each of one of the support bars 133. Upon installation of the last bar, the retainer ring 132 is rotated to bring its slot 134 opposite the land between a pair of adjacent slots 130. The ring 132 may then be secured in that position as by means of set screw 135 (FIG. 15). Disassembly may, of course, be accomplished by reversing this procedure.

In the illustrative machine 100, the rotor 116 is journaled for rotation upon a generally vetrical axis located centrally of the machine (FIG. 7). The upper end cap 127 is drivingly coupled, as by means of a keyed or splined connection, to output shaft 136 of motor driven reduction gear unit 112. The lower end cap 128 is formed with an integral stub shaft 137 journaled in a combined line and thrust bearing 138 of the antifriction type. The latter is mounted in a stationary hub 139 situated at the intersection of the frame crossbars 123.

Access to the rotor 116, and to the interior of the stator 115, is provided in the illustrative machine by means of a removable section of support bars 120a overlying the bone discharge aperture 140 (FIGS. 7, 11, 12). The bars 120a are identical with the bars 120 except for their shorter length and mode of fastening. Each of the bars 120a is secured at its lower end to an arcuate bracket 141 as by means of a cap screw 142. At its opposite end, each bar is fitted into the annular groove of the upper end wall 118 and secured in place as by means of a threaded stud 143 projecting therethrough and a wing nut 144 threaded thereon. The bars 120a and bracket 141 are manipulable as a unit. The ends of the bracket 141 are slotted at 145 and 146 to receive the adjacent full length support bars 120. To facilitate assembly and disassembly, the slot 145 is somewhat deeper than the slot 146 (FIG. 11).

Each of the stator support bars 120, 120a (FIGS. 7 through 11) carries a plurality of the resilient cleaning elements 101 which in this case comprise leaf spring arms 103. The support bars 120, 120a and the leaf spring arms 103 are arranged so that the latter project substantially radially inward toward the rotor, their projecting ends being spaced from the projecting ends of the cleaning elements 102 on the rotor by a predetermined clearance distance. This distance may, for example, be on the order of ⅛ to ¼ of an inch. The spring arms 103 are arranged in relatively close, longitudinally spaced relation along the support bars 120, 120a and in this case happen to be secured thereto as by means of pairs of rivets 147. In the present instance, the stator includes sixty-four such bars 120, 120a. Fifty-three of these bars each carry seventeen spring arms 103; the two bars 120 which flank the bone discharge aperture 140 each carry sixteen spring arms 103; and the nine short bars 120a over the aperture 140 each carry twelve arms 103. The spring arms, in one specific embodiment, are each made of spring tempered stainless steel 1 7/16 inch in width, 0.025 inch in thickness, and 6 inches in length mounted with a clearance of 1/16 inch between adjacent arms on the same support bar.

The projecting end portion of each stator cleaning element arm 103 (FIGS. 7, 10 and 18) is somewhat tapered, terminating in a reversely bent hook or finger element 148. In the present instance, the element 148 has a throat opening of about ¼ to 5/16 inch and its free end defines the blade 105 which normally faces away from the rotor. However, in the operation of the machine, the meat-laden bone engages and deflects the stator arm 103, bringing the hook 148 and its blade 105 into engagement with the bone (FIG. 10).

Alternatively, some or all of the stator cleaning element arms may have an open hook or finger element 148a at their projecting ends (FIG. 14). The hooks 148a also terminate in blades 105 and tend to provide somewhat more cutting and scraping action than the reversely bent hooks 148. They also tend to engage the surface of the bone with less spring arm deflection than is required by the hooks 148. The use of the hooks 148a will, of course, be governed largely by the nature of the bones being processed in the machine.

Each of the rotor support bars 133 (FIGS. 7 through 10, 18) carries a plurality of resilient cleaning elements 102 which in this instance comprise leaf spring arms 104. The latter are rigidly fixed to the leading face (relative to the direction of rotation) of their associated bar as by pairs of rivets 149 and project generally radially outward from the drum 125, stopping short of the ends of the stator elements 101 by the predetermined distance referred to above. The ends of the arms 104, except for the first course, define the cleaning element blades 106. The rotor spring arms 104 are mounted in relatively close, longitudinally spaced relation, in this case ten to a support bar and the rotor including 48 bars. These arms, in the specific embodiment last referred to, were made of spring tempered stainless steel 2⅜ inches in width, 0.050 inch in thickness, approximately 10 inches in length, mounted with a clearance of ⅛ inch between adjacent arms on the same bar.

The spring arms 104 in the first or upper course of rotor cleaning elements are somewhat shorter than the others, being formed with chamfered or tapered ends 150 so as to leave a large clearance area with respect to the stator cleaning elements 101 (FIG. 7). This clearance area is adapted to receive meat-laden bones from the loading chute 108. The tapered ends 150 of the first course of rotor cleaning elements, assisted by the end portions of the second course and by centrifugal force, direct the bones into active engagement wtih the other rotor and stator cleaning elements.

Provision is made for advantageously increasing the effective length and deflection of the stator and rotor spring arms 103, 104 when subjected to load incident to operation of the machine. This is accomplished by forming each spring arm 103, 104 with an offset intermediate its ends such that the projecting end portion of each spring arm will be situated in trailing relation to its inner end portion with respect to the direction of relative movement between the rotor and stator (FIGS. 7 through 10, 14).

Referring more particularly to FIGS. 7 and 10, it will be noted that each of the stator spring arms 103 is formed with an offset 151 intermediate its ends. The offset 151 defines an obtuse angle with each end portion of the spring arm 103. In like manner, each of the rotor spring arms 104 is formed with an offset 152 intermediate its ends and also defining an obtuse angle with each end portion of the arm 104. As will be evident from FIG. 10, upon deformation of the spring arms 103, 104 rearwardly due to engagement with a bone, the reaction force on each deflecting spring arm will be applied in part as a longitudinal tensile stress and in part as a lateral bending stress. Since a portion of the reaction force is taken up in tension, this tends to reduce the lateral bending stress on the spring arm. This factor, as well as the greater resiliency due to greater overall length in the spring arm, tends to minimize chances of spring breakage or permanent set.

With the cleaning elements 101 and 102 mounted as described above, it will be apparent that a meat-laden bone P delivered into the intake chute 108 will enter the stator and come in contact with the rotating end portions of the first and second courses of the rotor spring arms 104. These direct the bone between the opposed cleaning elements 101, 102 as permitted by bending of the spring supporting arms 103, 104 (see FIG. 10), according to the size and contour of the bone surfaces being cleaned. Thus, as shown in FIG. 10, the rotor cleaning elements 102 advancing in the direction indicated by the arrow will be bent backwardly far enough to accommodate the inner surface of the bone P. This deflection, particularly when two or more successive spring arms 104 are sandwiched together, results in the buildup of sufficient driving force to bend the stator cleaning elements 101 far enough to accommodate the outer surface of the bone P. The driving force of the rotor spring arms 104, and the reaction force of the stator spring arms 103, tend to rotate or tumble the bone. The relative resiliency of the two sets of spring arms 103, 104 is so proportioned that the turning bone will tend to remain roughly centered in the annular clearance space between the stator and rotor cleaning elements 101, 102.

In the course of this action, various ones of the blades 105 and 106 will engage the bone surface at different angles and thereby act in different ways in removing any meat adhering to the bone. Some of the stator blades 105 and their associated hook elements 148 will engage residual meat directly and pull or tear it off the bone in chunks. Others, both stator and rotor blades 105, 106, will at a given instant be in full contact with the bone surface and scrape across the latter to dislodge meat therefrom. Still other blades may be inclined so that only a corner of the blade engages the bone surface, thereby acting to cut or tear meat off the bone.

The action of each blade will vary in numerous other ways according to its angle of contact with the bone surface. Such angle also varies according to the contour of the bone surface along the rotor axis. With the bone disposed between the two annular sets of cleaning elements and engaged by these at a multiplicity of points spaced around as well as along the bone, the turning movement of the rotor against the bone will rotate or tumble the latter on a shifting individual axis in or near the bone and disposed generally longitudinally thereof. In this way, other parts of the bone surface are presented for engagement by the passing blades of both the inner and outer cleaning elements 101 and 102.

As already noted, the blades 105, 106 of the cleaning elements mounted as above described coact effectually during turning of the rotor to engage and clean the entire surfaces of bones which vary widely in size, shape and contour. An important aspect of the present invention is to utilize the same relative movement between the cleaning elements 101 and 102 to advance each bone progressively through the cleaning zone so as to present different areas of its surface to the cleaning elements, and also to remove the bone from engagement with the cleaning elements before any substantial amount of the bone has been scraped or chipped off.

The desired advance of the bone along the axis of the rotor and eventually out through the discharge opening 140 is achieved in the machine 100 by mounting one or both sets of the cleaning elements to act on the bones like a screw thread, thus utilizing the relative movement between the rotor and stator to advance the bone progressively along the rotor axis until it is discharged from between the cleaning elements. In the present instance, the cleaning elements 102 of the rotor and their spring arms 104 are arranged in a threadlike pattern of generally helical or spiral form. This is shown more fully in FIG. 17, which is a diagrammatic developmental view illustrating the free ends of the rotor spring arms 104 at the outer periphery of the rotor.

Referring more specifically to FIG. 17, it will be noted that this helical or spiral pattern is defined by a void or flute 153 approximately 1¼ inches wide and extending approximately 7 turns around the rotor over the course of the rotor length, the latter in this case being about twenty-six inches between end caps. Such helical pattern is obtained in a novel manner by forming the outer ends of the rotor spring arms with relatively wide relief notches, leaving projecting end portions of comparable width which terminate in the blades 106. In addition, the rotor spring arms 104 are arranged with their projecting end portions in a plurality of axially spaced rows, each of which extends only part way around the rotor circumference, and by overlapping adjacent rows in a circumferential direction to obtain the desired pitch of the flute or void 153 between the rows of spring arms. In this instance, the projecting end portions of the rotor arms 104 are arranged in groups of twenty-four in adjacent axially spaced rows, with adjacent sets of projecting end portions being overlapped circumferentially to the extent of four arms so as to obtain a staggered effect. This defines what appears in FIG. 17 to be seven voids 153, each comprising three straight-line portions offset progressively from upper left to lower right, as viewed in FIG. 17. However, in the actual spring arm pattern on the rotor, these voids are really one continuous passage or flute extending around the rotor about seven times in the length of the rotor.

Provision is made so that bones cannot enter so far into the flute or flutes 153 as to jam between the rows of projecting ends of the rotor spring arms 104. This is accomplished by limiting the depth of the flute 153 throughout the periphery of the rotor, including the interchanges or transition areas where the flute changes direction. Flute depth is determined along the major portion of its length by the depth of the relief notches. At the interchanges or transition areas, flute depth is determined in part by the depth of the relief notches and in part by the use of shortened spring arms having no projecting end portions. The latter also serve as rearward support members for preventing overbending of the bone-engaging spring arm or arms ahead of them.

The rotor 116 may also include means to facilitate positive ejection of cleaned bones through the discharge aperture 140 without undue interference with the flow of removed meat from the cleaning elements to the collecting hopper. This may be accomplished by forming the lowermost course of rotor spring arms 104 with integral extensions 154 which underlie the stator spring arms 103 in closely spaced relation therewith (FIG. 7). The extensions 154 may also be twisted on their radial axes, as shown in FIGS. 7 and 9, to increase the surface area which intercepts the falling bones. With this construction, bones reaching the lower end of the annular space between the cleaning elements 101, 102 will be supported and positively guided by the extensions 154, aided by centrifugal force, into the bone discharge aperture 140.

By reason of the helical or spiral progression pattern of the rotor cleaning elements 102 and their spring arms 104, the rotor elements 102 act on the bone in a manner analogous to a screw thread on a mating nut. This advances the bone axially as well as circumferentially of the rotor. The overall movements of a bone are illustrated in FIG. 6 from which it will be apparent that the bone is turned, rolled or tumbled continuously as indicated by the small arrows while being advanced bodily along a generally helical path which is indicated by the long arrows and which progresses both around and along the rotor axis. In a few revolutions around the rotor axis, the bone is carried to the ends of the rotor and stator and discharged from the bone discharge opening 140.

As shown in FIGS. 6 and 10, the bone will usually assume a position with its longer dimension extending generally along the rotor axis. Thus, the bone itself turns, rolls or tumbles with random motion about a shifting axis of its own while it is being advanced bodily around the rotor axis. By these combined actions, all surfaces of the bone are presented to the cleaning elements and each area is engaged many times and in many different ways with th result that the meat on the bone is substantially all removed without at the same time breaking or chipping off objectionable quantities of the bone itself. This is due not only to the comparative bluntness of the blades but also to the more pliable character of the meat coupled with the fact that the blades are mounted to yield when the more rigid surface of the bone is encountered.

It will be apparent that with the elements 101 and 102 mounted as described above, the machine adapts itself automatically to bones of widely varying sizes and shapes while acting with equal efficiency in removing the meat from the bone surfaces. At the same time relative motion between the elements to remove the meat from the bones is utilized in a novel manner to feed each bone through and out of the cleaning zone. It is only necessary, therefore, to deliver the bones into the chute 108, the cleaning operation then proceeding automatically.

In the present instance, it has been found that excellent resuts are obtained by operating the rotor at such speed as to impart to the outer ends of the inner cleaning elements 102 a linear speed of approximately 660 to 825 feet per minute.

By cleaning the bones in the manner contemplated, virtually all of the meat that could be removed by careful and laborious hand trimming is recovered. In addition, much of the labor spent according to present practice may be saved, since less hand trimming is required. The meat removed is largely lean and is readily usable in a wide variety of meat food products. In some instances it may be salable without further grinding as is necessary with the meat removed from bones by hand trimming.

Referring more specifically to FIGS. 19 through 30 another exemplary bone cleaning machine 200 by means of which the method of the invention may be carried out is there shown. The machine 200 comprises generally two sets of cleaning elements 210, 211 projecting toward each other and mounted on laterally yieldable spring arms 209 to receive a succession of bones B to be cleaned between them and for relative movement past each other so as to not only tear, cut, or scrape meat from the bone surfaces but also to advance the bones through and out of the cleaning zone defined by the adjacent ends or blades 213 and 214 of the opposed sets of cleaning elements. Preferably, the relative movement to effect the cleaning action is achieved by rotation between the two sets of cleaning elements about a fixed common axis and the rotary motion is also utilized to create a force for effecting the advance of the bone through the cleaning area as it is being acted on by the blades of the cleaning elements.

In this instance, the elements 210 and 211 are arranged to form generally cylindrical cleaning surfaces concentric with each other and one mounted stationarily while the other rotates about the common axis. The stator or stationary cylindrical mounting means is a generally cylindrical frame or cage 215 around which the elements 210 are spaced both axially or circumferentially and longitudinally, the cage being apertured for the free passage of finely ground pieces of meat outwardly therethrough. The cage is disposed within a hollow tubular casing 216 having end walls 217, 218 connected by tie bolts 219 (FIG. 20) and supported above the machine base 220. The cleaning elements 211 of the other or inner set are similarly spaced apart and project outwardly from a drum or inner cylindrical supporting means 221 having trunnions 222 at opposite ends journaled in bearings on the housing end walls. In this instance, the cleaned bones are discharged through an opening 223 (FIG. 20) formed by a ring 231 encircling a central opening in the end wall 217. The drum bearing at this end is carried by a crossbar 224 which is preferably U-shaped so that the bearing is spaced outwardly from the housing end wall 217. The other trunnion of the drum is coupled to a shaft 225 driven through a speed reducer from an electric motor 226 mounted on the machine frame.

As shown in FIG. 24, the blades 213 and 214 of the cleaning elements 210 and 211 are relatively short and disposed with their edges facing circumferentially around the rotor axis. Each element takes the form of a finger or hook fixed to the end of a relatively stiff but nevertheless flexible spring arm 209 anchored at its other end so as to be supported cantilever fashion for lateral bending in all directions. The blades are at the ends of hook shaped members or fingers 228 formed on the outer ends of the spring arms 209, which, in this instance and to obtain the desired characteristics, comprise cylindrical helical coils 227 of resilient wire with closely contacting convolutions about $\frac{3}{8}$ of an inch in diameter and of a substantial length, for example, 1½ to 3 inches. The wire used in the present instance is $\frac{1}{16}$ of an inch in diameter. Whereas in the illustrated embodiment of the invention, the flexible arms 209 comprise a helical coil of resilient wire, the flexible arms may be conveniently designated spring arms.

Each spring coil 227 is mounted cantilever fashion at one end and the wire extending beyond the other end is bent laterally of the coil axis to form the hook or finger 228 (FIGS. 8 to 10) which in the case of the rotor elements 11 opens in the direction of turning of the supporting rotor or drum 21 but reversely in the case of the stator elements 10. To this end, the wire is spiraled away from the terminal convolution of the coil into a plane including the coil axis and at the same time is bent upwardly in an arc 238 so as to leave a straight portion or finger 239 at the end. The latter is disposed perpendicular to the coil axis and projects transversely across the latter and outwardly beyond the side of the coil, the length of the finger 239 being about half an inch.

Some of the ends 213 and 214 which form the blades of the cleaning elements 210 and 211, in this instance the alternate elements of each row, are flattened as indicated at 240 (FIGS. 22 and 23) in a plane perpendicular to the coil and terminate in widened but rather blunt end edges 241 of the blades 213 or 214, the length of the latter being several times the diameter of the wire forming the fingers. The blades thus constructed are especially adapted to scrape the bone surfaces without gouging into and removing part of the bone proper. The ends of the other or intervening cleaning elements are flattened in a perpendicular direction as shown in FIG. 23 to produce a similar widening of the blade edge. Since the latter lies in a plane perpendicular to the direction of motion past the bone being cleaned, the corners of the edge may remove the meat by a tearing action and this, without cutting or gouging out any substantial amount of the bone itself.

The ends of the coils 227 opposite the cleaning elements 210 and 211 are anchored in the stator frame or on the rotor drum so as to be disposed substantially radially with the inner and outer cleaning elements disposed close to each other (FIGS. 20, 21, and 24) but spaced apart radially so as to pass by each other during turning of the drum. In the case of the stator elements, the end of the wire of the coil is bent at right angles as indicated at 229 (FIG. 24) and projected outwardly with a close fit through a hole in a bar 230 which spans the end walls 217 and 218 of the housing 216 and is clamped at opposite ends in rings 231 which abut against the housing end walls. After passing through the bar until the end of the coil comes into abutment with the bar, the wire is bent laterally and at right angles as indicated at 233 to lie in a slot 234. The projecting end 235 of the wire is again bent substantially at right angles to lie alongside the bar, the spring coil thus being locked against displacement laterally or longitudinally of the bar and held securely against twisting by the side walls of the slot 234.

The stator frame 215 is formed by the end rings 231 and a multiplicity of the bars 230 paralleling each other and the axis of the rotor and closely spaced around the circumference of the stator so as to locate the inner ends of the coils 227 on the adjacent bars about half an inch apart as shown in FIG. 24. The cleaning elements 210 are thus correspondingly spaced apart longitudinally of the stator, this being accomplished by drilling and slotting each bar 230 at regular intervals along its length as shown in FIG. 27 and attaching spring coils in the manner described above. To facilitate advance of the bones through the cleaning zone defined by the elements 210 and 211, the points of anchorage of the stator elements 210 on the adjacent bars 230 are preferably offset slightly from each other as shown in FIG. 27 so as to arrange the elements in a row which progresses helically around the stator with a lead angle $c$ on the order of 10 degrees. This angle is varied according to the desired rate of advance of a bone through the cleaning area and therefore the time during which a bone is subjected to the cleaning action.

The bones B to be cleaned are introduced into the cleaning area defined by the elements 210 and 211 by feeding the same in a radial direction through the stator elements near the end opposite that from which the cleaned bones are to be discharged. For this purpose, one or more of the bars 230 is omitted at the top of the stator as shown in FIG. 21 to provide a radial opening 246 vertically aligned with a chute 245 supported on the top of the housing 216 and projecting through an opening in the latter.

The meat removed from the bones by the action of the relatively rotating stator and rotor elements 210 and 211 is quite finely ground or comminuted, the pieces being comparable in size to ordinary hamburger. The particles are therefore small enough to gravitate downwardly between the coils 227 of the stator elements 210 and outwardly between the bars 230 of the frame. A coarse inclined screen 254 may be disposed below the stator to catch pieces of bone that may be chipped off in the cleaning process. The comminuted meat passing through the screen falls through an opening 255 in the bottom of the housing 216 and accumulates in a receptacle 256.

The coiled springs 227 carrying the rotor cleaning elements 211 are mounted cantilever fashion and project radially and outwardly from the rotor drum 221 while being spaced uniformly around and longitudinally of the latter to space the elements inwardly a short distance from the stator elements 210, in this instance about one-fourth of an inch. While the mounting of the rotor elements may be the same as described above for the stator elements 210, a special mounting is employed in the present instance to facilitate anchoring and spacing of the inner coil ends. This is achieved by bending the extended end 247 of the wire substantially at right angles to the coil 227 and, starting at a point close to the latter, winding a second coil 248 of the same or smaller size as the coil 227 and somewhat shorter than the latter. The second coil 248 is disposed on the side of the first opposite the cleaning element 211 on the latter and extends parallel to the shank 239 of the hook or finger of this element. The second coil 248 surrounds and is threaded onto a heavier wire 249 (FIG. 24) which extends helically around the drum 221 at the relatively small lead angle $d$ (FIG. 20). Eyes 250 at opposite ends of the wire are fastened as by screws to corresponding ends of the drum 221 after enough of the coils 248 have been threaded onto the wire to fill the entire length of the latter and bring the successive coils 248 into end to end abutment as shown in FIG. 24.

The coils 248 thus serve as spacers for determining the angular spacing of the elements 211. To complete the anchorage, the wire 251a at the outer end of the coil 248 is extended tangentially and at right angles to the coil axis along the surface of the supporting drum 21 so as to underlie the next adjacent coil 248 as indicated at 251. The extension bears against the drum surface thus preventing the coil 248 from turning in one direction. In the other direction, turning by unwinding of the coil 248 is prevented by the adjacent coil 248 and the supporting helix 249.

The cantilever mounting thus provided offers greater resistance to bending of each coil 227 and therefore the associated element 211 in one direction, clockwise as viewed in FIG. 29, than in the other direction. That is to say, each coil 248 when anchored at one end as above described resists turning of its other end with a force which is greater when the force is in a direction to wind the coil more tightly than when the bending tends to unwind the coil. As a result, the mounting of each element 211 is somewhat stiffer and offers more resistance to lateral flexure in one longitudinal direction along the rotor than in the reverse direction.

Such differential resistance to sidewise displacement of the rotor elements may be achieved in other ways. For example, the inner ends of the spring coils 227 may be disposed in a groove 260 which extends helically around the rotor drum 221 (FIG. 30). The groove 60 has side walls which after different degrees of flexing of the coil in opposite directions engage the coil at a point spaced a short distance outwardly from the ends. Thus, by its engagement with one of the groove walls, the effective or unsupported length of the spring coil is shortened causing a corresponding increase in the stiffness of the spring. By varying the angles at which the coil is disposed when it encounters the opposite side walls of the groove, the desired differential resistance of the spring to bending may be achieved.

In this instance, each rotor coil 227 is mounted in the manner previously described. That is to say, the extended end of the wire 247 is wound into a coil 248 which is threaded onto the helical supporting wire 249, the latter being laid around the bottom of the groove 260. By omitting the wire extensions 251 above described, the coil 248 is free to turn on the support 249 and is thus pivotally supported.

The desired advance of the bone along the axis of the drum and eventually out through the discharge opening is achieved in the present instance by the mounting of one or both sets of the cleaning elements to act on the bones like a screw thread and thus utilize the turning of the rotor to advance the bone progressively along the drum axis until it is discharged from between the cleaning elements. In the present instance, both sets of cleaning elements contribute to the screw action and accordingly the elements 210 and 211 of each set are arranged in arrow extending helically around the stator and rotor respectively. In the case of the stator elements 210, the helical arrangement is achieved by locating the points of anchorage of the coils 227 on the adjacent bars 230 in offset relation according to the lead desired in the helical row in which all of the elements are disposed. With the rotor turning in the direction indicated, the stator elements 210 are preferably disposed in the positions shown in FIG. 27 in order to facilitate advance of the bone in the direction indicated. A similar helical arrangement is achieved in the case of the rotor elements by mounting the latter in spaced relation around the supporting wire 249 which extends helically around the drum 221 from one end to the other.

The differential stiffening of the cleaning elements is achieved in the present instance in the mounting of the rotor elements 211. Either of the methods above described may be employed, the increased resistance of each element to bending being provided in the direction opposite that in which it is desired to advance the bones. That is to say, the mounting of the rotor elements is such that each is more readily yieldable in the desired direction of advance of the bones than in the opposite direction. Thus, with the mountings shown in FIG. 29, the bones are advanced through the cleaning area in the direction indicated by the arrow.

With the cleaning elements 210 and 211 mounted as described above, it will be apparent that a bone B delivered into the hopper 245 will pass down through the opening 246 in the stator and come in contact with the rotating blades 214 of the rotor elements 211. These carry the bone laterally in between the opposed cleaning elements 210 and 211 as permitted by bending of the spring supporting arms 209 (see FIG. 25), according to the size and contour of the bone surfaces being cleaned. Thus, as shown in FIG. 25, the elements 211 advancing in the direction indicated by the arrow will be bent backwardly far enough to pass the inner surface of the bone or until the driving force has, by bending of the coils 227 of the rotor elements, built up sufficiently to bend the stator elements out of the way of the advancing bone. In the course of this action, the blade edges 213 and 214 of the different blades will engage the bone surface at different angles and thereby act in different ways in removing any meat adhering to the bone.

The action of each blade will vary in numerous other ways according to its angle of contact with the bone surface which angle also varies according to the sloping of the bone surface along the rotor axis. This is illustrated in FIG. 29 which shows an elongated bone whose varying longitudinal contour may cause a bending of the spring coils 227 transversely of the direction of advance of the rotor elements.

With the bone disposed between the two annular sets of cleaning elements and engaged by these at a multiplicity of points spaced around as well as along the bone, the turning movement applied to the inner side of the bone will rotate the latter on its longitudinal axis. In this way, other parts of the bone surface are presented for engagement by the passing blades of both the inner and outer elements 210 and 211.

The rolling of the bone and its bodily advance about the rotor axis in the manner above described is accompanied by displacement of the cleaning elements 210 and 211 transversely of the path of relative movement between the stator and rotor elements. With the latter mounted to resist bending more in one direction than the other longitudinally, there is a definite tendency for the elements deflected in the direction of greater stiffness to urge the bone in the opposite direction thereby overcoming the weaker spring supporting the oppositely deflected elements. This action is augmented by the progression of the elements of each set helically around the rotor axis. By virtue of such progression, the rotor elements act on the bone in a manner analogous to a screw thread on a mating nut and thus advance the bone along the rotor axis in the directions of progression of the elements and also of their weakness to resist lateral deflection. In a similar way, the helically arranged stator elements 210 operate on the bone in a manner analogous to the thread of a nut and, since the helical progression is in the same direction as that of the rotor elements, the forces tending to shift the bone axially are correspondingly augmented. The overall movements of a bone are illustrated in FIG. 28 from which it will be apparent that the bone is turned continuously as indicated by the small arrows while being advanced bodily along a path which is indicated by the long arrows and which progresses both around and along the rotor axis. In a few revolutions around the axis, the bone is carried beyond the ends of the rotor and stator and discharged from the casing outlet 223.

FIG. 31 illustrates another form of bone cleaning machine 700 by means of which the method of the invention may be carried out. The machine 700 has two sets of cleaning elements 710 and 711 and their spring arms 709 are carried, respectively, by a pair of continous belts or conveyors 712 and 713. Bones to be cleaned are supplied to the cleaning elements 711 on the belt or conveyor 713 from a hopper 714. The conveyor or belt 713 is operated in the direction indicated at a fast speed, for example 25 r.p.m. The other conveyor or belt is operated in the same direction, as indicated, at a slow speed, for example 1 r.p.m. Thus, the cleaning elements 711 are rapidly moved relative to the cleaning elements 710, the cleaning elements 710 and 711 facing, respectively, in opposite directions. The conveyor 713 carries the bones to be cleaned between the cleaning elements 710 and 711, which, in the manner discussed above, cut, scrape and tear the meat from the bones because of the relative movement between the cleaning elements 710 and 711. This relative movement also causes the bones to rotate about their own axes to continually present new surfaces to the cleaning elements 710 and 711 to be cleaned thereby. Since the conveyor or belt 712 also moves forwardly, but at a slow speed, advancement of the bones longitudinally through the machine is assured. The meat removed from the bones is deposited on a belt conveyor 715 to be conveyed away in the direction indicated. The cleaned bones are deposited on a roll conveyor 716 to be conveyed away in the direction indicated. Any removed meat falling on the rolls 716 passes between the rolls onto the conveyor 715.

I claim as my invention:

1. A method of removing meat from bone and comprising the steps of providing relatively movable yieldable cleaning elements, subjecting a meat-laden bone to said yieldable cleaning elements with random tumbling motion so as to expose substantially its entire area to the action of said cleaning elements thereby removing meat from the bone, and simultaneously moving the bone in opposition to its tumbling motion along a predetermined path as an incident to exposure to said yieldable cleaning elements, said path being defined by said cleaning elements and having an axis external to the bone, collecting the removed meat, and ejecting the bone as it reaches the end of said path.

2. A method of removing meat from bone and comprising the steps of providing relatively movable yieldable cleaning elements, subjecting a succession of meat-laden bones to said yieldable cleaning elements with random tumbling motion so as to expose substantially the entire area of each bone to the action of said cleaning elements thereby removing meat from the bones, and simultaneously moving said succession of bones in opposition to their tumbling motion along a predetermined path as an incident to exposure to said yieldable cleaning elements, said path being defined by said cleaning elements and having an axis external to the bones, collecting the removed meat, and ejecting each bone as it reaches the end of said path.

3. A method of removing meat from a meat-laden bone and comprising the steps of tumbling the meat-laden bone with random motion about a constantly shifting axis while subjecting the bone to the action of yieldable cleaning elements, and simultaneously moving said bone in opposition to its random motion and along a predetermined path defined by said cleaning elements.

4. A method of removing meat from a meat-laden bone and comprising the steps of tumbling the bone with random motion about a constantly shifting axis while subjecting the bone to the action of cleaning elements, and simultaneously moving said bone in a generally spiral path.

5. A method of removing meat from a meat-laden bone and comprising the steps of tumbling the bone with random motion about a constantly shifting individual axis while subjecting the bone to the action of cleaning elements, and simultaneously moving said bone in a generally spiral path having an axis external to that of the bone.

6. A method of removing meat from a meat-laden bone comprising the steps of tumbling the meat-laden bone with random motion about a constantly shifting individual axis while subjecting the bone to the action of yieldable cleaning elements, and simultaneously moving said bone in opposition to its tumbling motion and along a predetermined path having an axis external to that of the bone.

7. A method of removing meat from a meat-laden bone and comprising the steps of tumbling the bone with random motion about a constantly shifting individual axis while subjecting the bone to the action of cleaning elements, and simultaneously bodily moving said bone in opposition to its tumbling motion and along a generally spiral path having an axis external to that of the bone.

8. A method as set forth in claim 3 wherein meat is removed from each of a succession of meat-laden bones.

9. A method of removing meat from bone and comprising the steps of providing a loading zone, providing a cleaning zone with relatively movable cleaning elements therein, providing a bone discharge zone and a meat collecting zone, introducing a meat-laden bone from the loading zone to the cleaning zone, subjecting the meat-laden bone to said cleaning elements with random tumbling motion about shifting axes so as to expose substantially its entire area to the action of said cleaning elements thereby removing meat from said bone, simultaneously moving the bone in opposition to its tumbling motion along a predetermined path as an incident to exposure to said cleaning elements, said path being defined by said cleaning elements and having an axis external to the bone, ejecting the bone into the bone discharge zone as it reaches the end of said predetermined path, and collecting the removed meat in the meat collecting zone.

10. A method of removing meat from bone and comprising the steps of providing a loading zone, providing a cleaning zone with yieldable cleaning elements therein, providing a bone discharge zone and a meat collecting zone, introducing meat-laden bones from the loading zone to the cleaning zone, subjecting each meat-laden bone to said cleaning elements with random tumbling motion about shifting individual axes so as to expose substantially its entire area to the action of said cleaning elements thereby removing meat from said bone, simultaneously moving said bones along a generally spiral path as an incident to exposure to said cleaning elements, ejecting each said bone into the bone discharge zone as it reaches the end of said generally spiral path, and collecting the removed meat in the meat collecting zone.

11. A method of removing meat from meat-laden bones and comprising the steps of providing a loading zone, providing a cleaning zone with yieldable relatively movable cleaning elements therein, providing a bone discharge zone and a meat collecting zone, introducing meat-laden bones from the loading zone to the cleaning zone, subjecting each meat-laden bone to said yieldable cleaning elements with random tumbling motion about shifting individual axes so as to expose substantially its entire area to the action of said cleaning elements thereby removing meat from said bone, simultaneously moving said bones along a generally spiral path in opposition to their tumbling motion and as an incident to exposure to said cleaning elements, ejecting each said bone into the bone discharge zone as it reaches the end of said generally spiral path, and collecting the removed meat in the meat collecting zone.

References Cited

FOREIGN PATENTS 235,827   6/1911   Germany.

LUCIE H. LAUDENSLAGER, *Primary Examiner.*

SAMUEL KOREN, *Examiner.*